(12) United States Patent
Suzuki et al.

(10) Patent No.: US 12,142,145 B2
(45) Date of Patent: Nov. 12, 2024

(54) INFORMATION PROCESSING METHOD, INFORMATION PROCESSING SYSTEM, INFORMATION PROCESSING DEVICE, AND INFORMATION TERMINAL

(71) Applicant: Nissan Motor Co., Ltd., Yokohama (JP)

(72) Inventors: Kazuhiro Suzuki, Kanagawa (JP); Yasunori Maruyama, Kanagawa (JP); Kenta Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/788,767

(22) PCT Filed: Dec. 15, 2020

(86) PCT No.: PCT/JP2020/046803
§ 371 (c)(1),
(2) Date: Jun. 24, 2022

(87) PCT Pub. No.: WO2021/131916
PCT Pub. Date: Jul. 1, 2021

(65) Prior Publication Data
US 2023/0032915 A1   Feb. 2, 2023

(30) Foreign Application Priority Data
Dec. 27, 2019   (JP) ................. 2019-238093

(51) Int. Cl.
*G08G 1/123*    (2006.01)
*G06Q 50/40*    (2024.01)
*G08G 1/0967*   (2006.01)

(52) U.S. Cl.
CPC ............. *G08G 1/123* (2013.01); *G06Q 50/40* (2024.01); *G08G 1/096775* (2013.01)

(58) Field of Classification Search
CPC .. G08G 1/123; G08G 1/096775; G06Q 50/30; G01C 21/34; G09B 29/00; G09B 29/10
See application file for complete search history.

(56) References Cited

U.S. PATENT DOCUMENTS

2004/0073478 A1* 4/2004 Gusikhin ............... G06F 30/00
703/1
2011/0118975 A1* 5/2011 Chen .................. G01C 21/3438
701/533
(Continued)

FOREIGN PATENT DOCUMENTS

CN   106248093 A   12/2016
CN   107883972 A    4/2018
(Continued)

OTHER PUBLICATIONS

Japanese Office Action of Jan. 9, 2024 of corresponding Japanese Patent Application No. 2021-567312.
(Continued)

*Primary Examiner* — Mohamed Barakat
*Assistant Examiner* — Rufus C Point
(74) *Attorney, Agent, or Firm* — Global IP Counselors, LLP

(57) ABSTRACT

An information processing method, an information processing system, an information processing device, and an information terminal are configured to set a first time at which a vehicle will start traveling on a travel route based on an operation accepted from a user via a terminal, and set a second time at which a notification to the user will be issued based on a position of the terminal, a position of the vehicle, and the first time.

7 Claims, 3 Drawing Sheets

(56) References Cited

U.S. PATENT DOCUMENTS

| | | | |
|---|---|---|---|
| 2014/0207373 A1* | 7/2014 | Lerenc | G01C 21/3438 |
| | | | 701/527 |
| 2016/0320198 A1* | 11/2016 | Liu | G01C 21/3438 |
| 2017/0039488 A1* | 2/2017 | Lin | G06Q 10/02 |
| 2017/0132934 A1* | 5/2017 | Kentley | G08G 1/202 |
| 2020/0143503 A1* | 5/2020 | Kim | G06Q 50/40 |
| 2020/0149902 A1* | 5/2020 | Fujimoto | G06Q 50/40 |
| 2020/0307352 A1* | 10/2020 | Boston | B60H 1/00357 |

FOREIGN PATENT DOCUMENTS

| | | | |
|---|---|---|---|
| CN | 110276463 A | 9/2019 | |
| JP | H8-159794 A | 6/1996 | |
| JP | H9-91587 A | 4/1997 | |
| JP | 2001-245337 A | 9/2001 | |
| JP | 2005-274463 A | 10/2005 | |
| JP | 4340912 B2 | 10/2009 | |
| JP | 2015-227852 A | 12/2015 | |
| JP | 2019-207587 A | 12/2019 | |
| WO | WO-2019235457 A1 * | 12/2019 | G06Q 10/02 |

OTHER PUBLICATIONS

Chinese Office Action of Jul. 23, 2024 of corresponding Chinese Patent Application No. 202080089994.2.

\* cited by examiner

INFORMATION PROCESSING METHOD, INFORMATION PROCESSING SYSTEM, INFORMATION PROCESSING DEVICE, AND INFORMATION TERMINAL

CROSS-REFERENCE TO RELATED APPLICATIONS

This application is a U.S. national stage application of International Application No. PCT/JP2020/046803, filed on Dec. 15, 2020. The present application claims priority based on Japanese Patent Application No. 2019-238093 filed on Dec. 27, 2019, and the entire contents thereof are incorporated herein by reference.

BACKGROUND

Technical Field

The present invention relates to an information processing method, an information processing system, an information processing device, and an information terminal.

Background Information

Japanese Patent Publication No. 4340912 (Patent Document 1) discloses a feature relating to a departure guidance device that, under circumstances in which one should arrive at a set point by a fixed time, predicts a travel time from the current position of a vehicle to a set point to calculate a departure time at the current vehicle position, and issues a notification based on the calculated departure time to a user.

SUMMARY

However, according to the feature disclosed in Patent Document 1, because a notification is issued that is based on a departure time based on a travel time from the current position of a vehicle to a set point, depending on the relationship between the position of the vehicle and the position of the user, there is a risk that the vehicle will not be able to actually depart from the current position at the departure time and the vehicle will not be able to arrive at the set point by the fixed time.

The present invention is designed in view of this problem, it being an object of the present invention to provide an information processing method, an information processing system, an information processing device, and an information terminal with which it is possible for a vehicle to arrive at a set point by a fixed time, regardless of the relationship between the position of the vehicle and the position of the user.

In order to achieve the abovementioned object, in an information processing method, an information processing system, an information processing device, and an information terminal according to one aspect of the present invention: a first time at which a vehicle will start traveling on a travel route is set based on an operation accepted from a user via a terminal, and a second time at which a notification to the user will be issued is set based on a position of the terminal, a position of the vehicle, and the first time.

According to the present invention, it is possible for a vehicle to arrive at a set point by a fixed time and convenience for a user can be improved, regardless of the relationship between a position of the vehicle and a position of the user.

BRIEF DESCRIPTION OF THE DRAWINGS

Referring now to the attached drawings which form a part of this original disclosure.

DETAILED DESCRIPTION OF EMBODIMENTS

Embodiments of the present invention are described in detail below with reference to the accompanying drawings. Redundant descriptions in which the same reference symbols are associated with the same elements are omitted.

Figure 1:
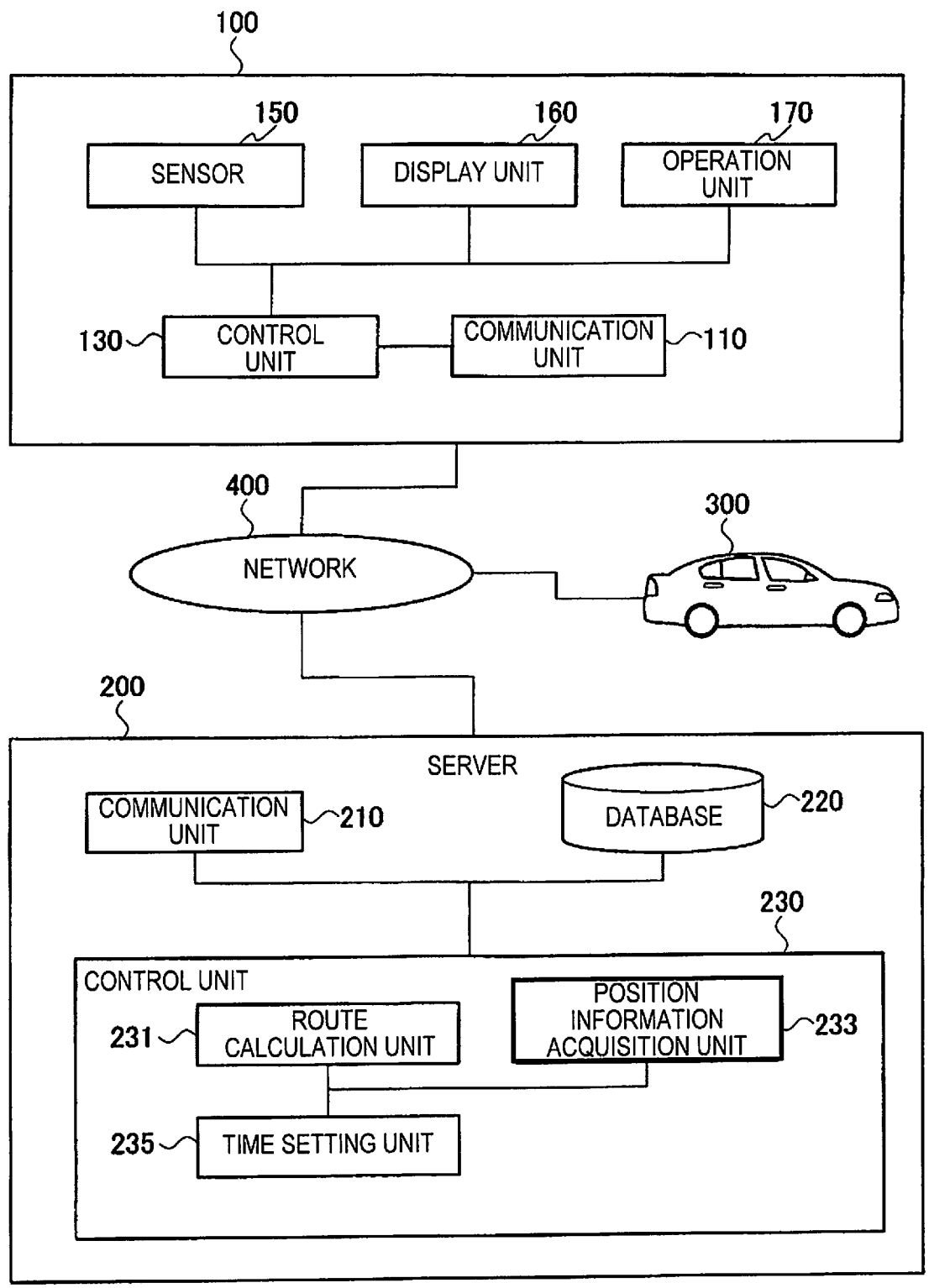
FIG. 1 is a block diagram showing a configuration of an information processing system according to one embodiment of the present invention.

FIG. 1 is a block diagram showing a configuration of an information processing system according to one embodiment of the present invention. The information processing system comprises a terminal 100 (information terminal), a server 200, and a vehicle 300, which are connected to each other over a wireless or wired network 400.

Examples of the network 400 include the Internet. A mobile communication function such as 4G/LTE or 5G may also be used as the network 400.

The terminal 100 accepts an operation from a user and transmits information relating to the accepted operation to the wired network 400. Examples of the terminal 100 include portable terminals that are routinely used by the user (smartphone, tablet, etc.).

By operating the terminal 100, the user specifies a destination to which the vehicle 300 will head and an estimated arrival time at which the vehicle will arrive at the destination. The user can also specify an estimated departure time at which the vehicle 300 will depart by operating the terminal 100. Therefore, the information relating to the accepted operation can include the destination to which the vehicle 300 is heading, the estimated arrival time, the estimated departure time, etc.

The vehicle 300 is a ridden object that provides a means of movement to the destination specified by the user; examples of the vehicle include an autonomously driven vehicle. Other examples of the vehicle 300 include manned/unmanned taxis, buses, trucks, and various other movement means. A plurality of vehicles can be registered in the information processing system.

An onboard device (not shown) is installed in the vehicle 300, and vehicle information about the vehicle 300 (such as, for example, sensor information indicating a remaining battery life installed in the vehicle 300, or sensor information indicating the degree of need for maintenance of the vehicle 300, such as an extent of dirt on a surface of the vehicle 300 or degree of wear of various components of the vehicle 300) is transmitted from the vehicle 300 to the network 400.

The onboard device can also, similarly to the terminal 100, accept operations from the user and transmit information relating to accepted operations to the network 400. The onboard device can acquire the estimated departure time of the vehicle 300, and set a startup time for various equipment (air conditioning system, seat heater, etc.) installed in the vehicle 300 based on the acquired estimated departure time. The onboard device can automatically start up the equipment before the vehicle 300 departs or as the vehicle 300 departs.

The vehicle 300 can transmit vehicle information about the vehicle 300 at a prescribed timing or at prescribed periods, and can transmit vehicle information about the vehicle 300 based on a request from the terminal 100 or the server 200.

More specifically, the vehicle 300 can transmit vehicle information, and particularly information indicating the remaining battery life, at the timing at which charging of the installed battery starts or the timing at which charging ends. In addition, the vehicle 300 can transmit vehicle information at the timing at which an ignition is turned on or the timing at which the ignition is turned off.

The server 200 acquires information transmitted from the terminal 100 or the vehicle 300 via the network 400, and searches for a travel route for the vehicle 300 based on the acquired information. The current position of the vehicle 300, map information about the area surrounding the destination, and road information are used in searching for a travel route.

It is hereinafter assumed that the terminal 100, the server 200, and the vehicle 300 can communicate with each other in both directions via the network 400.

The terminal 100 (information terminal) shall next be described. As shown in FIG. 1, the terminal 100 according to the present embodiment is provided with sensors 150, a display unit 160, an operation unit 170, a communication unit 110, and a control unit 130 (controller).

The sensors 150 are formed from a plurality of sensor groups and include a position detection sensor that acquires position information about the terminal 100. For example, the position detection sensor is a global positioning system (GPS) or other type of sensor that measures absolute position.

The sensors 150 can also include environment sensors that acquire environment information (information such as temperature, humidity, vibration, acceleration rate, and sound) relating to the environment in which the terminal 100 is present. For example, the environment sensors may be temperature sensors, humidity sensors, vibration sensors, acceleration sensors, microphones, etc.

The display unit 160 displays information about the vehicle 300 and information related to the travel route for the vehicle 300 searched for by the server 200. The information about the vehicle 300 and the information relating to the travel route are acquired by the communication unit 110 (described later) from the server 200 via the network 400. The display unit 160 can also display information for a route from the position of the terminal 100 to the position of the vehicle 300, the route information being required for the user to move to the position of the vehicle 300, and guidance information for guiding movement of the user.

Presenting the various information in the form of visual information is not a limitation on the display unit 160. The display unit 160 can present information to the user in the form of auditory information, and can cause vibration to present information to the user in the form of vibratory stimulation.

Through visual information, auditory information, and vibratory stimulation, the display unit 160 can issue various notifications to the user. Examples of the content of the notification issued by the display unit 160 include, inter alia, whether or not there is a travel plan for the vehicle 300, a planned departure time for the vehicle 300 in the travel plan, the travel route on which the vehicle 300 is planned to travel, and traffic information and weather information on the travel route. The time at which the display unit 160 issues the notification can be set by the server 200 (described later).

The operation unit 170 accepts operations performed by the user that correspond to various commands from the user to the information processing system. For example, the operation unit 170 may be an input interface provided with a plurality of buttons, or may be a touch panel provided with a touch interface.

More specifically, the display unit 160 displays an icon represented by a picture or a symbol so as to enable operation of the icon by the user, and the operation unit 170 accepts an operation by the user performed by the user touching, dragging, or otherwise manipulating the displayed icon.

The communication unit 110 transmits information to, and receives information from, the network 400. The communication unit 110 stores the information acquired from the network 400 in a memory, etc. (not shown), and outputs prescribed information, such as a request or environment information generated based on the operation performed by the user, to the network 400. For example, the communication unit 110 may be an onboard device provided with a 4G/LTE mobile communication function, or may be an onboard device provided with a Wifi communication function.

The control unit 130 is connected to the sensors 150, the display unit 160, the operation unit 170, and the communication unit 110. Information from the sensors 150, the operation unit 170, and the communication unit 110 is inputted to the control unit 130, and information directed to the display unit 160 and the communication unit 110 is outputted from the control unit 130.

The control unit 130 is a general-purpose microcomputer provided with a central processing unit (CPU), a memory, and an input/output unit. A computer program (information terminal program) for the purpose of functioning as part of the information processing system is installed in the control unit 130. By executing the computer program, the control unit 130 controls the display unit 160 and the communication unit 110.

Various information processes provided to the control unit 130 may be executed by software or by dedicated hardware.

As the information process performed by the control unit 130, particularly, the control unit 130 generates a request for the information processing system based on the operation performed by the user on the operation unit 170. For example, the request can include a designation of a destination to which the vehicle 300 is heading or a planned arrival time at which the vehicle will arrive at the destination. The request can also include a designation of a planned departure time at which the vehicle 300 will depart.

User attribute information may also be included in the request. Information about the user's preferences, age, gender, occupational category, or physical characteristics, as well as the occurrence of an event before or after the request and the classification of such an event, may be included in the user attribute information.

For example, when the terminal 100 is a portable terminal that is routinely used by the user (smartphone, tablet, etc.), an application serving as the information terminal program can acquire these items of attribute information by coordinating with a social networking service (SNS), another cloud service, etc.

The onboard device (not shown) installed in the vehicle 300 can, similarly with the terminal 100, comprise sensors 150, a display unit 160, an operation unit 170, a communication unit 110, and a control unit 130 (controller).

The server 200 (information processing device) shall next be described. As shown in FIG. 1, the server 200 according to the present embodiment is provided with a communication unit 210 (communication means), a database 220, and a control unit 230 (controller).

The communication unit 210 transmits information to, and receives information from, the network 400. The communication unit 210 acquires, from the network 400, requests transmitted from the terminal 100 and prescribed information such as vehicle information transmitted from the vehicle 300, and records the acquired information in the database 220. The communication unit 210 can acquire traffic information and weather information from an external server other than the server 200.

The database 220 stores information acquired by the communication unit 210, such as vehicle information about the vehicle 300, the position of the terminal 100, and the position of the vehicle 300. The server 200 can also store past requests from the user, the history and frequency of the use of the information processing system, etc. The database 220 may also store a variety of parameter tables for estimating the user characteristics of the user.

The control unit 230 (controller, one example of a processing unit) is a general-purpose microcomputer provided with a central processing unit (CPU), a memory, and an input/output unit. A computer program (information processing server program) for the purpose of causing the control unit 230 to function as part of the information processing system is installed in the control unit 230. By executing the computer program, the control unit 230 functions as a plurality of information processing circuits (231, 233, 235).

An example is described here in which the plurality of information processing circuits (231, 233, 235) provided to the control unit 230 are executed by software. However, it is also possible to configure the information processing circuits (231, 233, 235) by preparing dedicated hardware for executing various information processing described below. The plurality of information processing circuits (231, 233, 235) may also be configured from individual hardware.

The control unit 230 comprises a route calculation unit 231, a position information acquisition unit 233, and a time setting unit 235 as the plurality of information processing circuits (231, 233, 235).

The position information acquisition unit 233 (position information acquisition means) acquires the position of the terminal 100 and the position of the vehicle 300 via the communication unit 210. In addition, information about the destination to which the vehicle 300 is heading is acquired based on a request transmitted from the terminal 100.

Based on the position of the vehicle 300 acquired by the position information acquisition unit 233 and the destination designated by the user, the route calculation unit 231 (route calculation means) searches for a travel route to the destination and sets a route as the travel route to be used for the traveling of the vehicle 300.

The route calculation unit 231 calculates waypoints that must be passed through based on the vehicle information about the vehicle 300, and calculates a travel route leading through the waypoints to the destination. For example, when, within the vehicle information, the remaining life of the battery installed in the vehicle 300 is equal to or less than a prescribed threshold value, a charging spot is selected as a waypoint. When, within the vehicle information, there is a high degree of need for maintenance of the vehicle 300, a maintenance facility where cleaning of the vehicle 300 or replacement/repair of various components of the vehicle 300 is possible is selected as a waypoint. The route calculation unit 231 calculates a travel route leading through these waypoints to the destination.

In addition, the route calculation unit 231 can refer to the database 220 when searching for a travel route, and the route calculation unit 231 can search for a travel route based on map information, road information, traffic information, weather information, and also information such as the planned departure time at which the vehicle 300 and the planned arrival time at which the vehicle will arrive at the destination.

The travel route set by the route calculation unit 231 is outputted outside of the server 200, and serves other purposes such as, for example, being displayed on the terminal 100 and being used for the traveling of the vehicle 300.

The route calculation unit 231 sets a temporary route (first travel route) as the travel route immediately after the communication unit 210 has acquired the request from the user, and then sets a main route (second travel route) as the travel route at the time the main route is calculated (described later).

The time setting unit 235 (time setting means) sets a main route calculation time at which the route calculation unit 231 will start the process of setting the main route. More specifically, a time just before a first prescribed time from the time when the vehicle 300 will start traveling on the temporary route is set as a main route calculation time. The first prescribed time can be said to be a time between the time at which the vehicle information for the vehicle 300 is acquired and the time at which the vehicle 300 will start traveling on the temporary route. The user can be given the ability to set the first prescribed time, which is a parameter.

A temporary route calculation time, which is the time at which the route calculation unit 231 will start the process of setting the temporary route (a time immediately after the communication unit 210 acquires the request from the user, is differentiated from the main route calculation time.

The time setting unit 235 can set a time (reminder time) at which the terminal 100 will issue a notification to the user. More specifically, the time setting unit 235 sets a reminder time based on the position of the terminal 100 and the position of the vehicle 300 acquired by the position information acquisition unit 233, and the time (first time) at which the vehicle 300 will start traveling on the travel route.

For example, the time setting unit 235 can set a reference reminder time based on the time (first time) at which the vehicle 300 will start traveling on the travel route. The reference reminder time can be the time at which the vehicle 300 will start traveling on the travel route, and a time calculated by subtracting a second prescribed time from the time at which the vehicle 300 will start traveling on the travel route can be set as the reminder time. The user can be given the ability to set the second prescribed time, which is a parameter.

The time setting unit 235 can calculate a travel time for the user to move from the position of the terminal 100 to the position of the vehicle 300, and can set a time calculated by subtracting the travel time from the reference reminder time as a correction reminder time (second time).

The travel time for the user can be calculated by calculating a movement distance from the position of the terminal 100 to the position of the vehicle 300 based on map information and road information, and dividing the movement distance by a prescribed velocity. The prescribed velocity is a velocity at which the movement means (walking, automobile, bicycle, etc.) used by the user moves.

In addition, information about the weather at the position of the terminal 100 or information about the weather at the position of the vehicle 300 can be acquired, and the time during which the user moves can be calculated based on the weather information. Specifically, the travel time can be calculated such that the travel time in a case of bad weather (rain, snow, storm, etc.) is longer than the travel time in a case of good weather (sunny, cloudy, etc.).

The time setting unit 235 can set the reminder time based on the time at which the vehicle 300 will start traveling on the temporary travel route, or can set the reminder time based on the time at which the vehicle 300 will start traveling on the main travel route.

Figure 2:
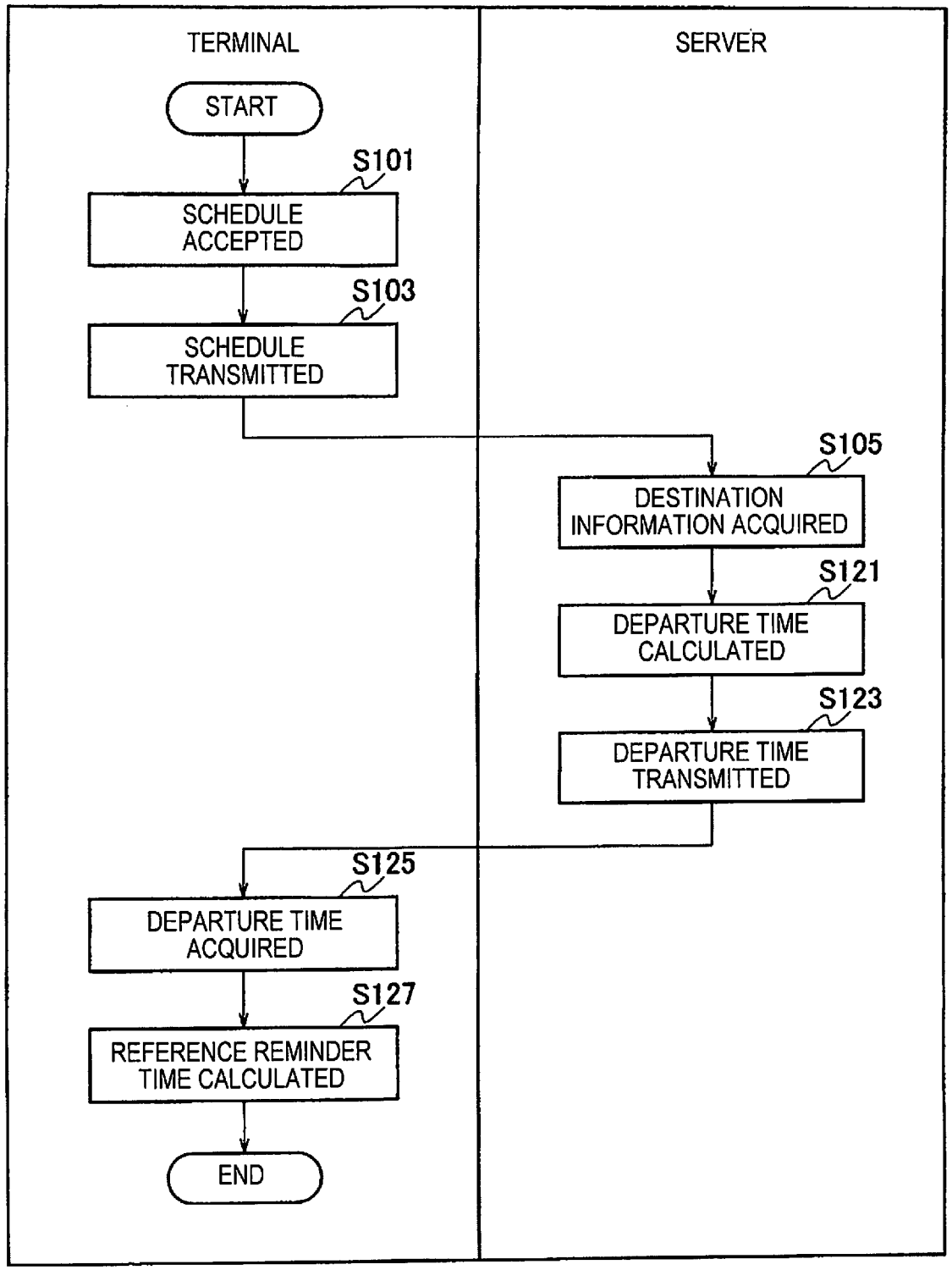
FIG. 2 is a flowchart showing a process procedure leading up to a reference reminder time calculation in the information processing system according to one embodiment of the present invention.
Figure 3:
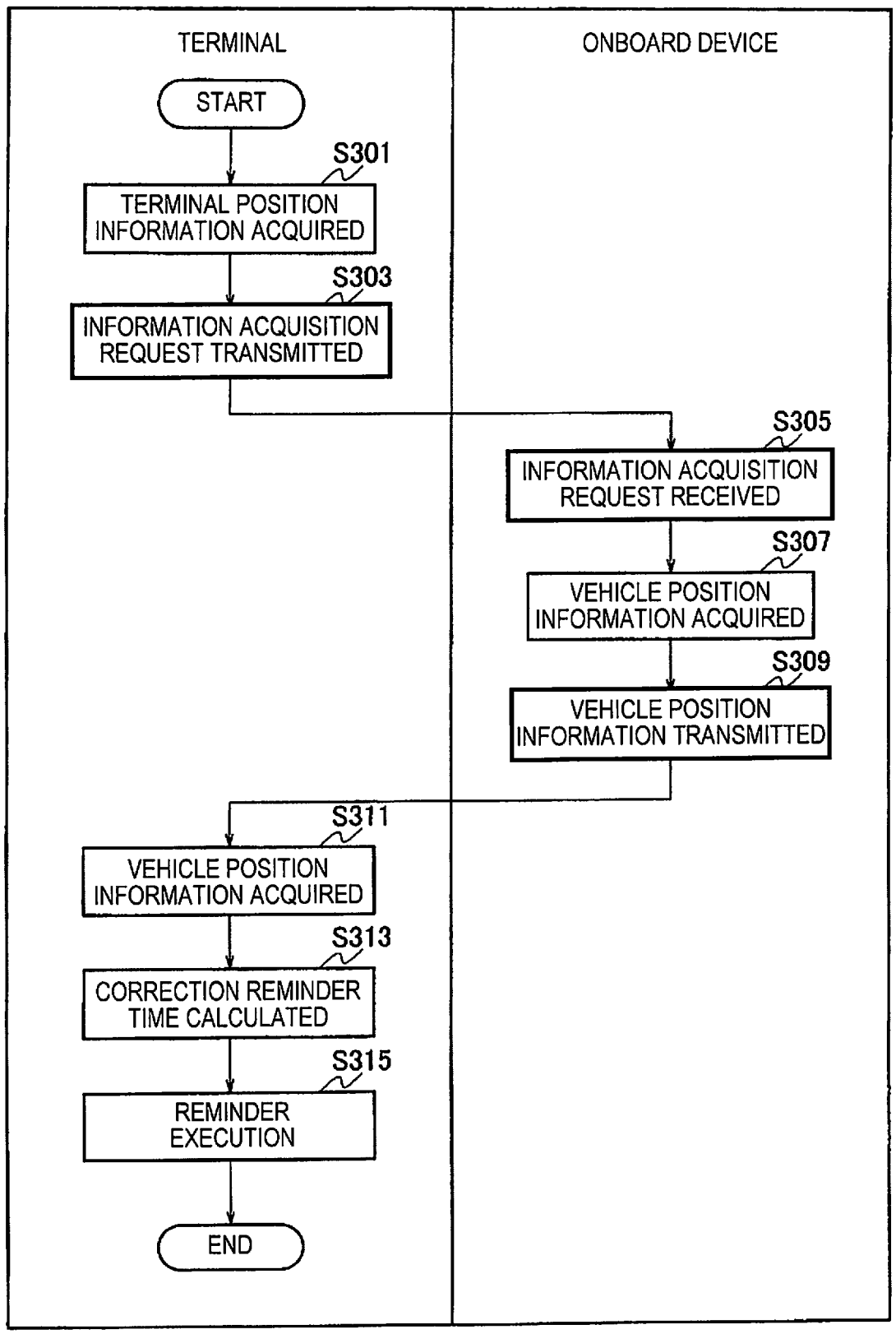
FIG. 3 is a flowchart showing a process procedure leading up to a correction reminder time calculation and a reminder execution in the information processing system according to one embodiment of the present invention.

A process procedure of the information processing system according to the present embodiment shall next be described with reference to the flowcharts of FIGS. 2 and 3. FIG. 2 is a flowchart showing a process procedure leading up to a reference reminder time calculation in the information processing system according to one embodiment of the present invention. FIG. 3 is a flowchart showing a process procedure leading up to a correction reminder time calculation and a reminder execution in the information processing system according to one embodiment of the present invention.

The process of the flowchart shown in FIG. 2 is begun when the terminal 100 starts up.

In step S101, the terminal 100 accepts a schedule from the user. Specifically, the terminal accepts from the user a request including the destination to which the vehicle 300 is heading and a planned arrival time.

In step S103, the terminal 100 transmits the accepted schedule (request).

In step S105, based on the accepted request, the server 200 acquires information about the destination to which the vehicle 300 is heading.

In step S121, based on the accepted request, the server 200 calculates a planned departure time at which the vehicle 300 will depart. The planned departure time can be calculated by subtracting the travel time required to travel over the travel route from the planned arrival time after the travel route by which the vehicle 300 heads to the destination has been calculated by the server 200, or, instead of a calculation, a planned departure time included in the accepted request can be set.

In step S123, the server 200 transmits the planned departure time.

In step S125, the terminal 100, having transmitted the request, acquires the planned departure time from the server 200.

In step S127, the terminal 100, having transmitted the request, calculates a reference reminder time based on the planned departure time.

Next, the process of the flowchart shown in FIG. 3 is begun at a prescribed timing that occurs after the reference reminder time has been calculated and before the planned departure time.

In step S301, the terminal 100 acquires information about the position of the terminal 100.

In step S303, the terminal 100 transmits an information acquisition request to the onboard device of the terminal 100.

The onboard device, having received the information acquisition request in step S305, acquires the information about the position of the vehicle 300 in step S307.

In step S309, the onboard device transmits the acquired information about the position of the vehicle 300.

In step S311, the terminal 100, having transmitted the information acquisition request, acquires the information about the position of the vehicle 300.

In step S313, the terminal 100 calculates a correction reminder time based on the position of the terminal 100, the position of the vehicle 300, and the reference reminder time.

In step S315, the terminal 100 performs a reminder execution. Specifically, the terminal 100 issues a notification to the user.

As described in detail above, in the information processing method, information processing system, information processing device, and information terminal according to the present embodiment, a first time at which a vehicle will start traveling on a travel route is set based on an operation accepted from a user via a terminal, and a second time at which a notification to the user will be issued is set based on a position of the terminal, a position of the vehicle, and the first time.

Due to this feature, it is possible for the vehicle to arrive at a set point by a fixed time and convenience for the user can be improved, regardless of the relationship between the position of the vehicle and the position of the user.

In addition, in the information processing method, information processing system, information processing device, and information terminal according to the present embodiment, a travel time for the user to move from the position of the terminal to the position of the vehicle can be calculated, and the second time can be calculated based on the travel time. Due to this feature, as the user moves further away from the vehicle and a longer time will be required for the user to board the vehicle, the second time at which a notification to the user will be issued will be set commensurately earlier, and it will be possible for the user and the vehicle to arrive at the set point by a fixed time. As a result, convenience for the user is improved.

Furthermore, in the information processing method, information processing system, information processing device, and information terminal according to the present embodiment, the travel time can be calculated by dividing a movement distance from the position of the terminal to the position of the vehicle by a prescribed velocity. It is thereby possible to more accurately estimate the travel time required for the user to move from the position of the terminal to the position of the vehicle.

In addition, in the information processing method, information processing system, information processing device, and information terminal according to the present embodiment, weather information for the position of the terminal or the position of the vehicle can be acquired, and the travel time can be calculated based on the weather information. It is thereby possible to estimate the travel time for the user more accurately even when the travel time changes due to the weather.

Furthermore, in the information processing method, information processing system, information processing device, and information terminal according to the present embodiment, information about traffic on the travel route can be acquired, the first time can be reset based on the traffic information, and the second time can be set based on the position of the terminal, the position of the vehicle, and the reset first time. It is thereby possible to reset the planned departure time and estimate the planned arrival time even when the travel time required for the vehicle to travel over the travel route changes due to traffic on the travel route. Furthermore, because the second time at which a notification to the user will be issued is set based on the planned departure time after the resetting, it is possible for the user and the vehicle to arrive at the set point by a fixed time even when there is traffic on the travel route. As a result, convenience for the user is improved.

The functions shown in the embodiments above can be implemented by one or more processing circuits. The term 'processing circuit' includes a programmed processor, an electrical circuit, or the like, and furthermore includes a device such as an application-specific integrated circuit (ASIC), circuit-configured elements arranged so as to execute described functions, and other configurations.

The particulars of the present invention were described above according to an embodiment, but such disclosures are not provided by way of limitation to the present invention; it would be obvious to a person skilled in the art that various modifications and improvements can be made. The discussion and drawings constituting a part of this disclosure should not be understood as limiting the invention. From this disclosure, various alternative embodiments, examples, and operation techniques will be apparent to a person skilled in the art.

As shall be apparent, the present invention includes various embodiments, etc., that are not described above. Therefore, the technical scope of the present invention is defined only by the subject matter according to the claims reasonably derived from the foregoing descriptions.

Time

The invention claimed is:

1. An information processing method in which a server and a terminal are used to issue a reminder relating to a vehicle to a user before the user boards the vehicle, the information processing method comprising:
setting a destination and a planned arrival time based on an operation of the terminal by the user, the planned arrival time being a time at which the vehicle will arrive at the destination;
sending the destination and the planned arrival time from the terminal to the server:
the server calculating a first time at which the vehicle will start traveling from a set point based on the destination and the planned arrival time, the first time being a departure time at which the vehicle can depart from the set point and arrive at the destination by the planned arrival time;
the server acquiring a position of the terminal from the terminal, the position of the terminal being detected by a sensor provided on the terminal;
the server calculating a travel time for the user to move from the position of the terminal to the set point by dividing a movement distance from the position of the terminal to the set point by a prescribed velocity;
the server sending the first time and the travel time to the terminal;
the terminal setting a second time at which the reminder is to be issued to the user so that the user can arrive at the set point to board the vehicle by the first time, the second time being calculated by subtracting the travel time from the first time; and
the terminal issuing the reminder to the user at the second time.

2. The information processing method according to claim 1, further comprising acquiring weather information about the position of the terminal or a position of the vehicle, and the travel time is calculated based on the weather information.

3. The information processing method according to claim 1, further comprising acquiring traffic information about traffic on the travel route; and resetting the first time based on the traffic information to obtain a reset first time, the second time being based on the position of the terminal, the set point, and the reset first time.

4. An information terminal comprising:
a processor;
a sensor that detects a position of the information terminal; and
a display,
the information terminal being configured to accept an operation performed by a user, generate a request based on the operation and send the request to a server, and issue a reminder relating to a vehicle to the user before the user boards the vehicle, the reminder being presented at a reminder time that is set by the server,
the information terminal being configured to
receive a destination and a planned arrival time based on an operation of the information terminal by the user, the planned arrival time being a time at which the vehicle will arrive at the destination,
send the destination and the planned arrival time to the server so that the server calculates a first time at which the vehicle will start traveling from a set point based on the destination and the planned arrival time, the first time being a departure time at which the vehicle can depart from the set point and arrive at the destination by the planned arrival time,
send the position of the information terminal detected by the sensor to the server so that the server calculates a travel time for the user to move from the position of the information terminal to the set point by dividing a movement distance from the position of the terminal to the set point by a prescribed velocity,
receive the first time and the travel time from the server,
set a second time at which the reminder is to be issued to the user so that the user can arrive at the set point to board the vehicle by the first time, the second time being calculated by subtracting the travel time from the first time, and
control the display to issue the reminder to the user at the second time.

5. The information processing method according to claim 1, further comprising setting a startup time for at least one of an air conditioning system and a seat heater of the vehicle based on the first time.

6. An information processing system comprising:
a terminal that includes a processor and is configured to accept an operation of a user; and
a server that includes a processor and is configured to process the operation, the information processing system being configured to issue a reminder relating to a vehicle to the user before the user boards the vehicle by executing the following:
setting a destination and a planned arrival time based on an operation of the terminal by the user, the planned arrival time being a time at which the vehicle will arrive at the destination,
sending the destination and the planned arrival time from the terminal to the server;
the server calculating a first time at which the vehicle will start traveling from a set point based on the destination and the planned arrival time, the first time being a departure time at which so that the vehicle can depart from the set point and arrive at the destination by the planned arrival time based on a position of the set point,
the terminal receiving the first time from the server and calculating a travel time for the user to move from a position of the terminal to the set point by dividing a movement distance from the position of the terminal to the set point by a prescribed velocity, the position of the terminal being detected by a sensor provided on the terminal, and the terminal setting a second time at which the reminder is to be issued to the user so that the user can arrive at the set point to board the vehicle by the first time, the second time being calculated by subtracting the travel time from the first time, and the terminal issuing the reminder to the user at the second time.

7. An information processing device comprising:

a server that includes a processor and is configured to accept a request from a terminal, which includes a processor, on which a user performs an operation and process the request, the server being configured to issue a reminder relating to a vehicle to the user via the terminal before the user boards the vehicle, the server being further configured to receive a destination and a planned arrival time from the terminal based on an operation of the terminal by the user, the planned arrival time being a time at which the vehicle will arrive at the destination, calculate a first time at which the vehicle will start traveling from a set point based on the destination and the planned arrival time, the first time being a departure time at which the vehicle can depart from the set point and arrive at the destination by the planned arrival time, acquire a position of the terminal from the terminal, the position of the terminal being detected by a sensor provided on the terminal, calculate a travel time for the user to move from the position of the terminal to the set point by dividing a movement distance from the position of the terminal to the set point by a prescribed velocity, and set a second time at which the reminder is to be issued to the user so that the user can arrive at the set point to board the vehicle by the first time, the second time being calculated by subtracting the travel time from the first time, and send the second time to the terminal so that the terminal issues the reminder to the user at the second time.

* * * * *